(12) United States Patent
Itskovich

(10) Patent No.: US 9,229,125 B2
(45) Date of Patent: Jan. 5, 2016

(54) TDEM FORWARD FOCUSING SYSTEM FOR DOWNHOLE USE

(75) Inventor: Gregory B. Itskovich, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 136 days.

(21) Appl. No.: 12/883,638

(22) Filed: Sep. 16, 2010

(65) Prior Publication Data

US 2011/0063949 A1 Mar. 17, 2011

Related U.S. Application Data

(60) Provisional application No. 61/243,420, filed on Sep. 17, 2009.

(51) Int. Cl.
*G01V 1/40* (2006.01)
*G01V 1/42* (2006.01)

(52) U.S. Cl.
CPC .................................... *G01V 1/42* (2013.01)

(58) Field of Classification Search
CPC ........................................................ G01V 1/40
USPC ................................................................ 367/81
See application file for complete search history.

(56) References Cited

U.S. PATENT DOCUMENTS

| | | | | |
|---|---|---|---|---|
| 3,707,700 A | * | 12/1972 | Lafont | E12B 47/12 340/854.9 |
| 5,485,089 A | * | 1/1996 | Kuckes | G01V 3/26 175/45 |
| 5,678,643 A | | 10/1997 | Robbins et al. | |
| 5,955,884 A | * | 9/1999 | Payton | G01V 3/26 324/339 |
| 6,219,619 B1 | * | 4/2001 | Xiao | G01V 3/28 324/339 |
| 6,344,746 B1 | * | 2/2002 | Chunduru | G01V 11/00 324/335 |
| 6,636,045 B2 | * | 10/2003 | Tabarovsky | G01V 3/38 324/343 |
| 7,019,528 B2 | * | 3/2006 | Bittar | G01V 3/30 324/337 |
| 7,031,839 B2 | | 4/2006 | Tabarovsky et al. | |
| 7,046,009 B2 | | 5/2006 | Itskovich | |
| 7,046,165 B2 | | 5/2006 | Beique et al. | |
| 7,167,006 B2 | | 1/2007 | Itskovich | |
| 7,202,671 B2 | | 4/2007 | Strack et al. | |
| 7,289,909 B2 | | 10/2007 | Thomann et al. | |
| 7,408,150 B1 | | 8/2008 | Flaum et al. | |
| 7,746,076 B2 | | 6/2010 | Ostermeier et al. | |
| 2002/0186013 A1 | * | 12/2002 | Tabarovsky | G01V 3/38 324/343 |
| 2005/0030059 A1 | * | 2/2005 | Tabarovsky | G01V 3/28 324/323 |
| 2005/0083161 A1 | * | 4/2005 | Minerbo | G01V 3/28 336/132 |
| 2007/0168134 A1 | * | 7/2007 | Strack | G01V 3/24 702/7 |
| 2007/0216416 A1 | | 9/2007 | Itskovich | |
| 2008/0053213 A1 | | 3/2008 | Birchwood | |

(Continued)

*Primary Examiner* — Amine Benlagsir
(74) *Attorney, Agent, or Firm* — Mossman Kumar & Tyler PC

(57) ABSTRACT

A method and apparatus for estimating a parameter of interest of an earth formation ahead of a carrier within borehole. The method including estimating one or more functions based on received signals that may reduce the sum of the signals received by a first receiver, and estimating the parameter of interest based on signals received by one or more additional receivers by applying the one or more functions and, if necessary, a defocusing factor, such that reception of information from downhole of a selected downhole location is enhanced relative to reception of information uphole from the selected location. The apparatus including two or more transmitters, two or more receivers, and a processor to estimate one or more functions, and, based on these functions, the parameter of interest.

13 Claims, 12 Drawing Sheets

(56) References Cited

U.S. PATENT DOCUMENTS

| | | |
|---|---|---|
| 2009/0026359 A1 | 1/2009 | Stephenson et al. |
| 2009/0037111 A1 | 2/2009 | Radtke et al. |
| 2009/0097368 A1* | 4/2009 | Vlutters ............... G11B 7/0062 369/47.15 |
| 2009/0237084 A1* | 9/2009 | Itskovich ................. G01V 3/28 324/339 |
| 2009/0243618 A1* | 10/2009 | Wang ....................... G01V 3/28 324/338 |
| 2010/0021394 A1 | 1/2010 | Yu |
| 2010/0097065 A1 | 4/2010 | Itskovich et al. |

* cited by examiner

TDEM FORWARD FOCUSING SYSTEM FOR DOWNHOLE USE

CROSS-REFERENCE TO RELATED APPLICATIONS

This application claims priority from U.S. Provisional Patent Application Ser. No. 61/243,420, filed Sep. 17, 2010.

BACKGROUND OF THE DISCLOSURE

1. Field of the Disclosure

The present disclosure relates to estimating one or more parameters of interest relating to an earth formation. In one aspect, the present disclosure relates to a method of determining one or more parameters relating to the earth formation ahead of a selected location in a borehole.

2. Background of the Art

Exploration and production of hydrocarbons generally requires drilling a borehole into the earth. The borehole can be used to gain access to depths of the earth for performing measurements related to the exploration and production.

Well logging is a technique used to perform the measurements in the borehole. In well logging, a logging tool is conveyed through the borehole. For "logging-while-drilling" (LWD), a logging tool is coupled to a drill string. Thus, the measurements can be performed while the borehole is being drilled, during interruptions in drilling, or as the drill string is conveyed along the borehole. In post drilling applications, a logging tool may be conveyed via a non-rigid carrier such as a wireline in order to log the earthen formation. Generally speaking, logging tools may transmit signals into the earthen formation and then detect reflected signals and/or the response of the earthen formation to the transmitted signals.

In some situations, it may be desirable to have a tool that is predominantly sensitive to the one or more formation features downhole of the selected downhole location and, at the same time, is minimally affected by the formation properties uphole the selected downhole location.

SUMMARY OF THE DISCLOSURE

In aspects, the present disclosure is related to an apparatus and method estimating properties of a feature of interest obtained by a logging tool used to measure resistivity of an earth formation in a borehole. More particularly, the present disclosure relates to a method of determining the resistivity of the earth formation ahead of a drill bit or wireline positioned in the borehole.

In one embodiment, the present disclosure relates to a method for measuring a parameter of interest relating to a subsurface formation, comprising: estimating the parameter of interest by applying at least one focusing function to at least one receiver output, the at least one focusing function being estimated using signals received by a first receiver of a plurality of receivers.

In another embodiment, the present disclosure relates to a method for measuring a parameter of interest relating to a subsurface formation, comprising: conveying two or more receivers in a wellbore using a carrier; generating a plurality of signals with two or more transmitters; receiving a plurality of signals with the two or more receivers; estimating one or more functions that will reduce a sum of a plurality of signals received by a first receiver of the two or more receivers, the first receiver being located furthest uphole from a selected downhole location and at least one of the two or more receivers, wherein the plurality of signals includes electromagnetic transients, and wherein the plurality of signals are sequential such that the signals proceed from the transmitter furthest from the selected downhole location to the transmitter closest to the selected downhole location; and estimating the parameter of interest by applying the one or more estimated functions to at least one receiver located downhole from the first receiver, wherein the parameter of interest is resistivity, and wherein the estimation of the parameter of interest includes the use of a defocusing factor.

In another embodiment, the present disclosure relates to an apparatus for estimating a parameter of interest relating to a subsurface formation, comprising: a carrier configured for use in a wellbore; a first receiver mounted along the carrier and located uphole of a selected downhole location on the carrier; one or more receivers mounted along the carrier and located between the first receiver and the selected downhole location on the carrier; and a processor configured to: process signals received by the plurality of receivers to estimate the parameter of interest by applying at least one focusing function to at least one receiver output, the at least one focusing function being estimated using signals received by the first receiver of the plurality of receivers.

In another embodiment, the present disclosure relates to an apparatus for estimating a parameter of interest relating to a subsurface formation, comprising: a carrier configured for use in a wellbore; a first transmitter located uphole of the selected downhole location on the carrier; one or more transmitters located between the first transmitter and the selected downhole location; a first receiver mounted along the carrier and located furthest uphole of a selected downhole location on the carrier; one or more receivers mounted along the carrier and located between the first receiver and the selected downhole location on the carrier; and a processor configured to: estimate one or more functions that will reduce a sum of a plurality of signals received by the first receiver, and estimate the parameter of interest by applying the one or more estimated functions to the plurality of signals received by at least one of the one or more receivers, wherein the plurality of signals includes sequential electromagnetic transients, and wherein the estimation of the parameter of interest includes the use of a defocusing factor.

The parameter of interest may be estimated through the use of transient electromagnetic measurements when current may be sequentially switched off in a set of three transmitting coils and transient signals are measured in two receivers placed apart from each other. The first receiver is placed between the first and second transmitter, while the second receiver is placed between the second and third transmitter. The distance between the first transmitter and the drill bit is bigger than the distance between the third transmitter and the bit. The collected data are combined in a special way, which permits focusing of the transient signal downhole of the drill bit with only minimal sensitivity to the formation features uphole of the drill bit.

The distance to the approaching boundary is determined using inversion process.

Further disclosed is a machine-readable medium having machine-executable instructions for estimating a property of a portion of an earth formation ahead of a borehole penetrating the formation by implementing a method including: receiving one or more uphole signals from a previous depth of a logging tool; constructing a model of the earth formation using the uphole signals; predicting deep reading signals using the model; receiving measured deep reading signals; calculating a difference between measured deep reading signals and the predicted deep reading signals; and estimating the property from the difference.

Examples of the more important features of the disclosure have been summarized rather broadly in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION OF THE DISCLOSURE

Figure 1:
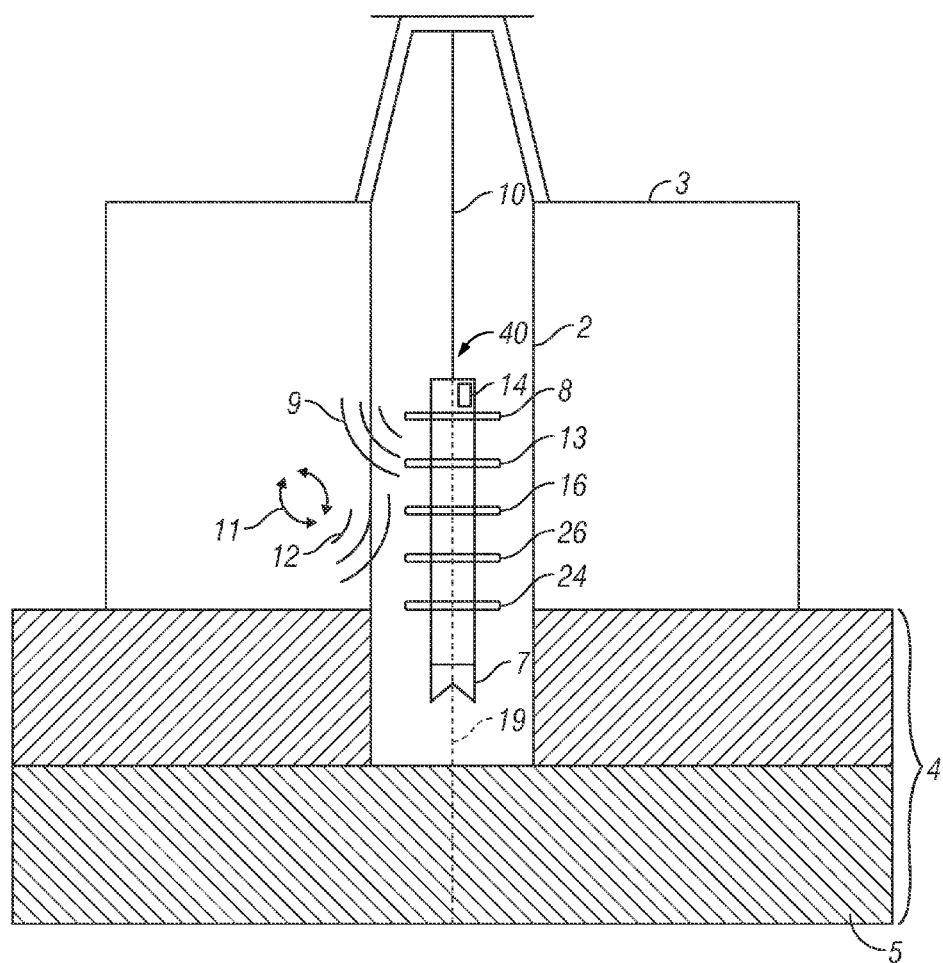
FIG. 1 schematically illustrates one embodiment according to the present disclosure.

A variety of formation parameters may be evaluated or estimated in order to characterize an earthen formation. An illustrative, but not exclusive, list of these parameters includes resistivity, porosity, and permeability of a rock formation. Merely for ease of explanation, the present disclosure will describe the present teachings in the context of resistivity measurements with the understanding that the present teachings may be applied to other types of formation evaluation.

Resistivity may be measured using an induction logging tool, which measures eddy currents generated in the formation. In general, an induction logging tool includes at least one transmitter coil and at least one receiver coil separated and positioned along a longitudinal axis of the logging tool. Induction logging measures the resistivity of the formation by first inducing eddy currents to flow in the formation in response to a current flowing through the transmitter coil, which transmits electromagnetic energy into the formation. Current in the transmitting coils can be either sinusoidal shape (frequency AC excitation) or step function (transient regime). The eddy currents, in turn, generate electromagnetic signals, which are received by the at least one receiver coil. Variations in the magnitude of the eddy currents in response to variations in the resistivity of the earth formation are reflected as variations in the received electromagnetic signals. Thus, in general, the magnitude and phase of the electromagnetic signals (AC excitation) or signal decay (transient regime) are indicative of the resistivity of the earth formation.

The transient electromagnetic field is widely used in surface geophysics. Voltage or current pulses excited in a transmitter initiate propagation of an electromagnetic field in the Earth. Electric currents diffuse outwards from the transmitter into the surrounding formation. At different times, information arrives at the measurement sensors from different depths of observation. Herein, "information" may include raw data, processed data, analog signals, and digital signals. Particularly, at a sufficiently late time, the transient electromagnetic field is sensitive only to remote formation zones and does not depend on the resistivity distribution in the transmitter vicinity. This is especially important for logging applications. In the traditionally used AC mode, corrections for borehole and mud filtrate require multi-position/multi-frequency measurements and sophisticated data processing. In a transient mode, even a single receiver may produce a satisfactory cancellation of near borehole effects.

In general, induction systems are comprised of several transmitting and several receiving coils mounted on some support. The coils, normally, have different orientations and are spaced apart from each other at different distances. The induction signals in the receivers are predominantly sensitive to the conductive beds (resistivity<10 ohms) and less sensitive to the resistive formation (resistivity>100 ohms). For example, for ZZ-oriented coils, the response of the downhole tool placed in the conductive bed will only slightly depend on the distance to the boundary if the layer downhole of the downhole tool is a resistive one. It can be said in this case the tool is sensitive to the conductivity of the formation uphole of a selected downhole location and is relatively insensitive to the parameters of interest, which are the formation features down hole of the selected down hole location.

Disclosed are illustrative embodiments of techniques and associated tools for detecting significant features of an earth formation ahead of a carrier positioned inside a borehole when transient electromagnetic measurements are utilized The techniques may use resistivity measurements (or its inverse conductivity) of the earth formation ahead of a selected downhole location, e.g., the earth formation ahead of the carrier. In one use, an induction logging tool provides resistivity data at different depths as the logging tool travels into the earth formation. In some embodiments, the carrier includes a drill bit, and the induction logging tool provides resistivity data as the drill bit advances into the earth formation. Resistivity data from previous depths (i.e., uphole data) and resistivity data from shallow reaches at the current depth may be used to construct a formation model. The earth formation ahead of the carrier is referred to herein as the "forward formation." The predicted signal is then subtracted from the current signal at the current depth to provide a difference signal. If the resistivity of the forward formation is identical to the previous resistivity measurement, then the difference signal will be zero or a residual of the system noise of the induction logging tool. If the difference signal is significantly different from zero, then the difference signal provides an indication that a characteristic of the earth formation is changing as the borehole is drilled deeper.

The difference signal can be an indication of the magnitude or proximity of an impending change in resistivity of the earth formation as the borehole is drilled deeper. A significant non-zero difference signal can indicate that the forward formation has a significant feature. Non-limiting examples of the significant feature include a fault, a salt diapir, an oil-water contact, a low resistivity layer, and a high resistivity layer. In one aspect, a significant non-zero difference is a difference from which information about the formation may be inferred or obtained.

FIG. 1 illustrates an exemplary embodiment of a downhole Time Domain Electromagnetic Measurements (TDEM) tool 40 disposed in a borehole 2 penetrating the earth 3 on a carrier 10. The downhole tool 40 has a longitudinal axis 19. Within the earth 3 is a formation of interest 4. In one embodiment, the carrier 10 may be a drill string having a drill bit 7 disposed at the distal end of the carrier 10. A forward formation 5 is that portion of the formation 4 that lies ahead of the drill bit 7. In general, the longitudinal axis 19 penetrates or leads to the forward formation 5.

The downhole tool 40 may be configured to perform induction logging measurements to determine resistivity (or conductivity) of the formation 4. As such, the downhole tool 40 includes at least two transmitter coils that are configured to transmit electromagnetic (EM) energy 9 into the formation 4. The transmission of EM energy is illustrative and exemplary only as is the use of coils to transmit the EM energy. In the illustrated embodiment, three transmitter coils 8, 16, 24 are used. However, in other embodiments, more than three transmitter coils may be used.

Figure 2:
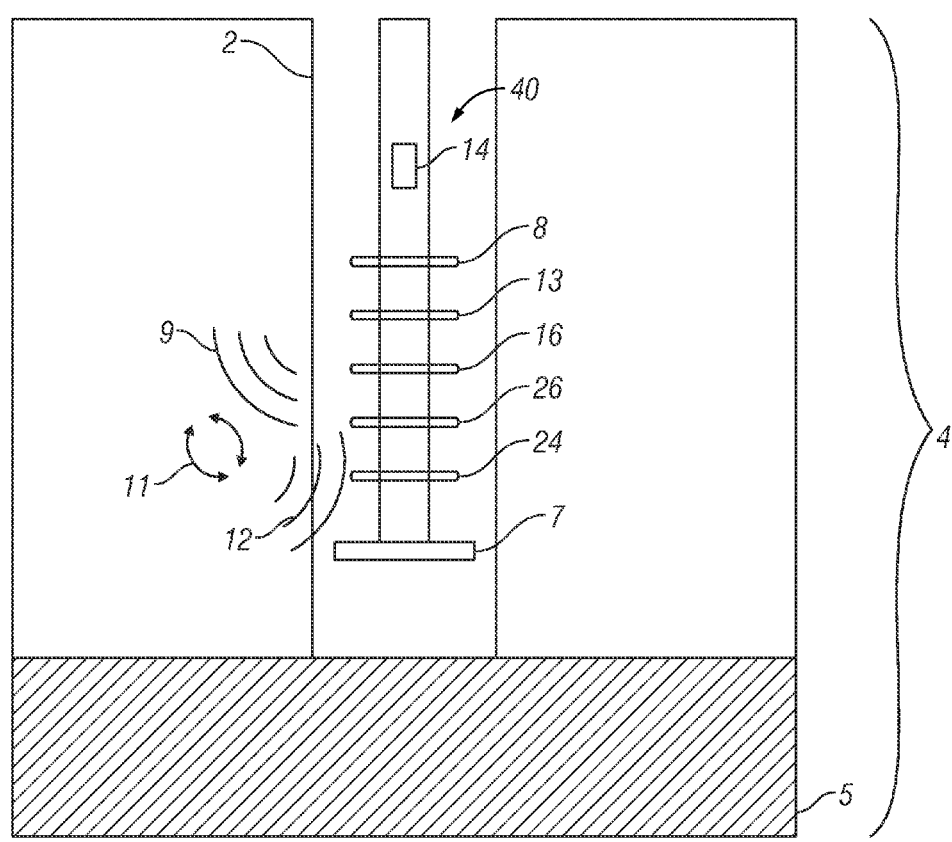
FIG. 2 schematically illustrates a close up of the downhole tool according to one embodiment of the present disclosure.

FIG. 2 shows a close up of downhole tool 40 inside borehole 2. In this embodiment, an EM transient induces eddy currents 11 in the formation 4. The transmitter coils 8, 16, 24 transmit in sequence starting from the transmitter coil furthest uphole 8 and proceeding downhole with the transmitter coil furthest downhole 24 transmitting last. This transmission sequence is illustrative and exemplary only, and other sequences may be used within the scope of this disclosure. Further, the location of the transmission coils 8, 16, 24 along the downhole tool 40 is exemplary only. For instance, the transmission coils may be remotely located relative to the downhole tool 40 within the borehole 2, anywhere along the carrier 10 within the formation 4, or at other locations within the earth 3, such as an offset well.

The first receiver coil 13 may be placed between the first transmitter coil 8 and second transmitter coil 16, while the second receiver coil 26 may be placed between the second transmitter coil 16 and the third transmitter coil 24. This transmitter (T)/receiver (R) pattern of TRTRT is illustrative and exemplary only, and the transmitters and receivers may be arranged in any combination. Additionally, the number of transmitters and receivers is not limited to a combination of three transmitters and two receivers, but any number of transmitters and receivers may be used as long as there are at least two transmitters and two receivers. The distance between the first transmitter coil 8 and a selected downhole location is greater than the distance between the third transmitter coil 24 and the drill bit 7. The drill bit 7 is merely an exemplary selected downhole location and other selected downhole locations may be used such as, but not limited to, the distal end of the carrier or an intermediate location along a carrier.

The transmitted EM energy 9 induces eddy currents 11 to form in the formation 4. The eddy currents 11, in turn, cause EM signals 12 that may be received by the receiver coils 13, 26 disposed along the downhole tool 40. The EM signals 12 are related to the resistivity of portions of the formation 4 at which the eddy currents 11 are generated. Thus, by receiving and measuring the EM signals 12, the resistivity of those portions can be determined.

The receiver coils 13, 26 are electrically conveyed to a processing unit 14, which may be configured to process the EM signals 12. The processing unit 14 may also be configured to operate the transmitter coils 8, 16, 24. The processing unit 14 may be located on the downhole tool 40, along the carrier 10, or above the earth 3, hence processing of the EM signals 12 may take place within the borehole 2 or outside of the borehole 2. If the processing unit 14 is not located near the receiving coils 13, 26, then a transmitter (not shown) may be used to convey the received signals to the location of the electronic unit 14. The transmitter may use any suitable form of signal transmission including acoustic, optical, electrical, etc. The processing of the EM signals 12 by the processing unit 14 is illustrative and exemplary only. For example, the processing unit 14 may perform some of the data processing with further processing taking place in another processing device located inside or outside of the borehole 2.

To better illustrate the present teachings, an example is used wherein the carrier is located in the formation with, for example, a resistivity of 1 ohm, while a formation with a resistivity of 10 ohms lies five or ten meters ahead of the carrier. Herein, the transmitter coils 8, 16, 24 have substantially the same moments, $M_T=1$, and all receiver coils 13, 26 have substantially the same moments, $M_R=1$, and the method may be described using the following notation: the signal excited by the transmitter $T_i$ (i=1, 2, 3) (denoting transmitter coils 8, 16, 24) and measured in the receiver $R_j$ (j=1, 2) (receiver coils 13, 26) is receiver information denoted as $S_j^i(t)$. After three sequential excitations of transmitters $T_i$ (i=1, 2, 3) there are in the receiver $R_1$ three signals $S_1^1(t), S_1^2(t), S_1^3(t)$. Similarly, in the second receiver, there may be three signals $S_2^1(t), S_2^2(t), S_2^3(t)$ from each transmitter. These signals may be combined in the first receiver in such way that satisfy the following condition:

$$S_1^1(t) + F(t)S_1^2(t) + S_1^3(t) = 0 \qquad (1)$$

From equation (1) we derive function F(t) that is uniquely defined as:

$$F(t) = -(S_1^3(t) + S_1^1(t))/S_1^2(t) \qquad (2)$$

By definition, function F(t) results, when eddy currents from all the transmitters are received by receiver $R_1$, in a sum of the signals that is equal to zero. One can say that in the vicinity of receiver $R_1$ eddy currents from all the transmitters are focused. For this reason, function F(t) may be called a "focusing factor." Herein, a focusing factor may be a mathematical function or model that may be estimated using information from at least one receiver. In some embodiments, the focusing factor may then be applied to information received by one or more receivers. The focusing factor may decrease a signal component from at least one receiver to at least one of: (i) a lower level, (ii) a predetermined level, and (iii) zero. For any other hypothetical receiver along Z direction, the signals from the three transmitters, being combined according (1), do not satisfy condition (1) if the same focusing factor F(t) is applied. At the same time, at each point along Z direction, the degree of deviation from condition (1) is different. The closer the measurement point is located to the position of the first receiver $R_1$, the better the condition (1) holds. And, accordingly, for the measurement point placed at longest distance from the receiver $R_1$, the condition (1) provides the worst focusing.

Poor focusing, or defocusing, may be caused by a number of factors. One factor that causes defocusing is the positioning of the second receiver apart from the receiver $R_1$ (for which the F(t) factor is introduced). Another factor is the presence of non-homogeneity in the vicinity of the receiver $R_2$. Indeed, because of geometrical reason any geo-electrical non-homogeneity ahead of the carrier affects the signal in the receiver $R_2$ much more strongly than the signal in the receiver $R_1$, since receiver $R_1$ is placed at a greater distance from the non-homogeneity. In other words, by combining signals in the receiver $R_2$ according to (1), the illustrative method filters out a portion of the signal caused by the part of the formation above receiver $R_2$ (uphole from the selected downhole location) while emphasizing portion of the signal caused by the forward formation features, e.g., downhole of receiver $R_2$.

As would be understood to one of ordinary skill in the art, in this embodiment, focusing is achieved for the expense of the level of the transformed signals (see (1)) derived from the measured signals.

The small ratio between the transformed signal $\Delta S_2$ $$\Delta S_2 = S_2^{\ 1}(t) + F(t)S_2^{\ 2}(t) + S_2^{\ 3}(t) \tag{3}$$

and the original signal $S_2^{\ 3}$ is an indication that significant portion of the original signal was canceled out:

$$\frac{\Delta S_2}{S_2^3} = \frac{S_2^1(t) + F(t)S_2^2(t) + S_2^3(t)}{S_2^3} < < 1. \tag{4}$$

For example, a $$\frac{\Delta S_2}{S_2^3}$$

ratio equal 0.01 indicates that 99% of the signal is canceled out and signal/noise ratio (SNR) in case of 1% noise is 1. Such SNR may lead to large errors in the estimation of the formation parameters. This condition is called over-focusing. To avoid over-focusing, a defocusing factor α may be introduced, which may modify the receiver information to compensate for over-focusing. The defocusing factor may include a value or a function and may be selected as a trade-off between desirable sensitivity of the transformation of the receiver information by the focusing factor and the amount of signal reduction to one or more portions of the receiver information. One exemplary application of a defocusing factor may be according to the following formula:

$$S_2^{\ 1}(t) + (F(t) + \alpha)S_2^{\ 2}(t) + S_2^{\ 3}(t) = 0 \tag{5}$$

where defocusing factor α may be varied between 0 (minimal defocusing) and 1 (maximum defocusing).

By varying the defocusing factor, a reasonable compromise between desirable sensitivity of the derived transformation $\Delta S_2$ to the parameter of interest and degree of the signal reduction in a portion of the receiver information may be achieved.

The qualitative consideration of a reasonable compromise may be checked numerically in cases where non-homogeneity of the forward formation is presented by a geo-electrical boundary that separates two sections of the formation with the resistivity of 1 and 10 ohms correspondingly. For this example, the model was selected with a small sensitivity of the unfocused signal to the ahead of the carrier boundary because it provides an opportunity to demonstrate the advantage of using the described focusing transformations.

Figure 3:
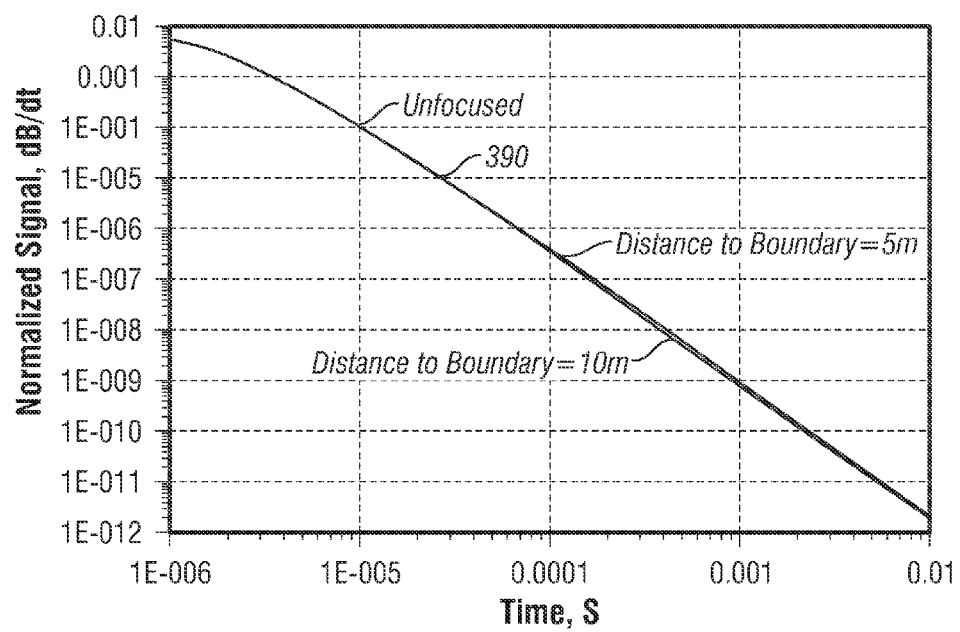
FIG. 3 graphically depicts and unfocused signal received by one embodiment according to the present disclosure.

The quality of the resolved transient signals (without defocusing) corresponding to the distance to the bed of 5 and 10 m is shown in FIG. 3, which shows results for the normalized value of dB/dt in the second receiver $R_2$ excited by the third transmitter $T_3$. As would be understood by one of skill in the art, increasing sensitivity to maximum results in a signal value too small to be measured. By balancing the need for sensitivity with the strength of signal, it is possible to achieve a high sensitivity with a measurable signal.

To numerically quantify a sensitivity value of the signal dB/dt with respect to distance d, normalized partial derivatives of dB/dt with respect to the normalized distance to the boundary d are used as follows:

$$\eta_d^{\dot B}(t) = \frac{\Delta \dot B(t)}{\dot B(t)} \frac{d}{\Delta d}, \tag{6}$$

where $\Delta \dot B(t)$ is the difference between two signals $\dot B(t)$ corresponding to the two different positions of the boundary (for example, at 5 and 10 m) and $\Delta d/d$ is the normalized change in the distance (for example, (10 m−5 m)/5 m=1). The advantage of using dimensionless norm (6) is that it allows us to compare sensitivities of different sets of data regardless the underlying physics (for example, compare transient and frequency measurements) and measured characteristics.

Figure 4:
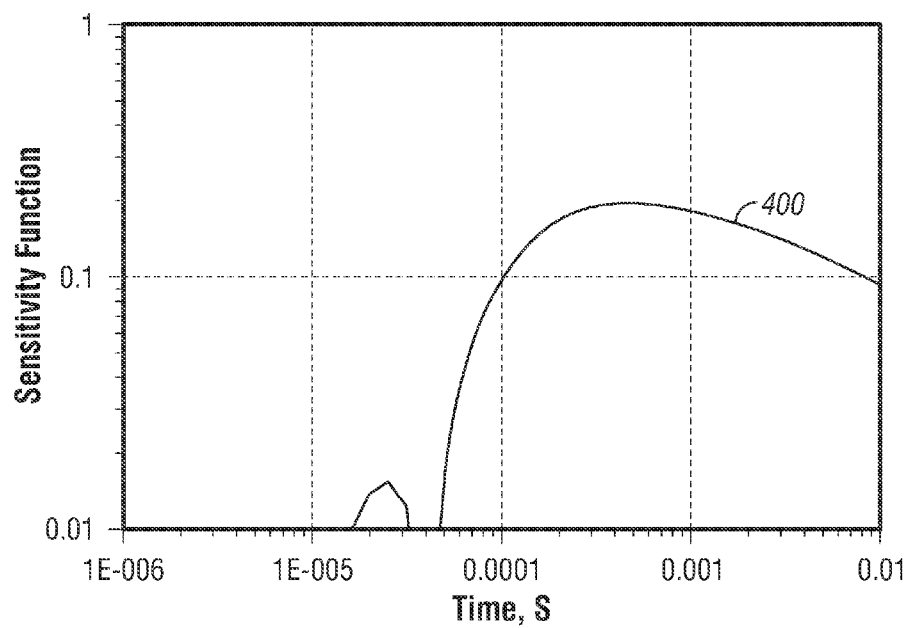
FIG. 4 graphically depicts the sensitivity function of an unfocused signal of one embodiment according to the present disclosure.

By applying formula (6) to the data 390 in FIG. 3 we derive time-dependent sensitivity function 400 $\eta_d^{\dot B}(t)$ presented in FIG. 4. As we see from FIG. 4 the maximum of the sensitivity function is approaching the value of 0.2. This value suggests that the relative error $$\frac{\Delta d}{d}$$

in defining distance to the boundary will be 5 times bigger than the relative error in the measured data $$\frac{\Delta \dot B(t)}{\dot B(t)}.$$

Indeed, $$\frac{d}{\Delta d} = \frac{\Delta \dot B(t)}{\dot B(t)} \frac{1}{\eta_d^{\dot B}(t)} = 5.0 \cdot \frac{\Delta \dot B(t)}{\dot B(t)} \tag{7}$$

Figure 5:
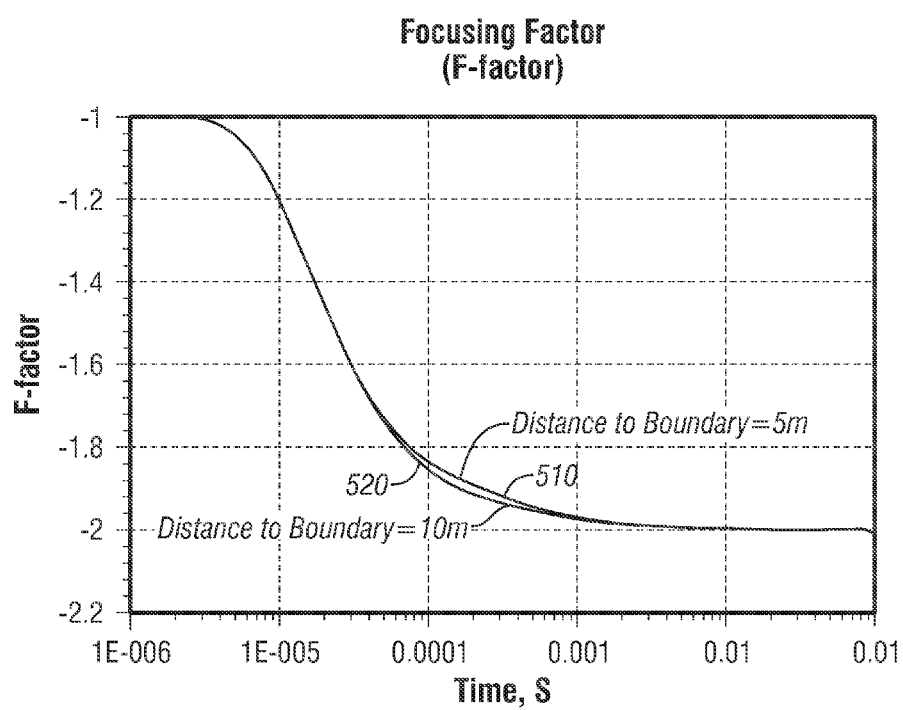
FIG. 5 graphically illustrates the focusing factor varying with time in one embodiment according to the present disclosure.
Figure 6:
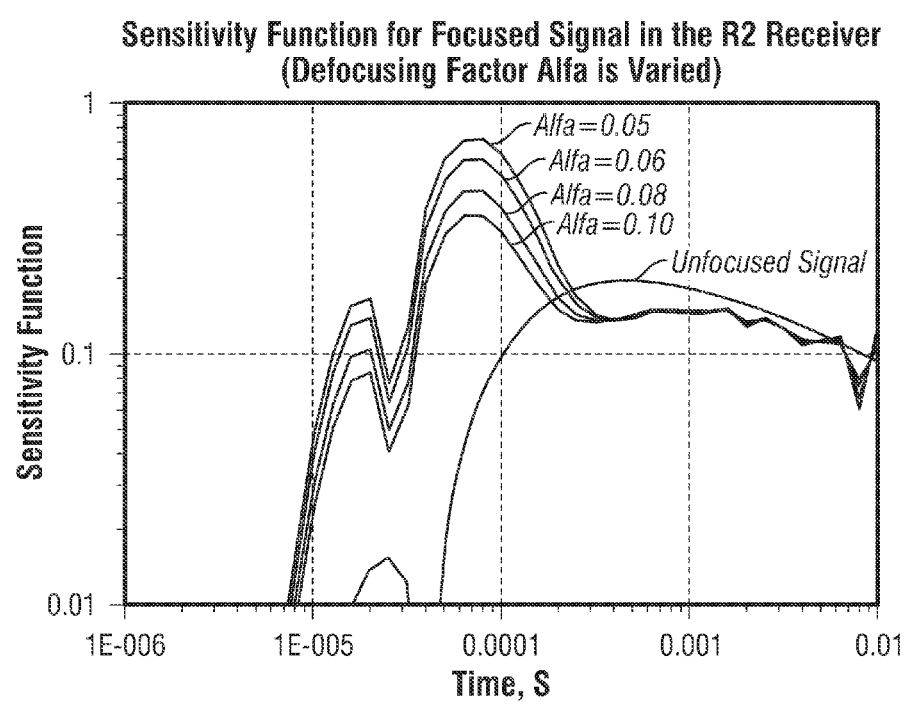
FIG. 6 graphically illustrates the effect of a defocusing factor in one embodiment according to the present disclosure.
Figure 7:
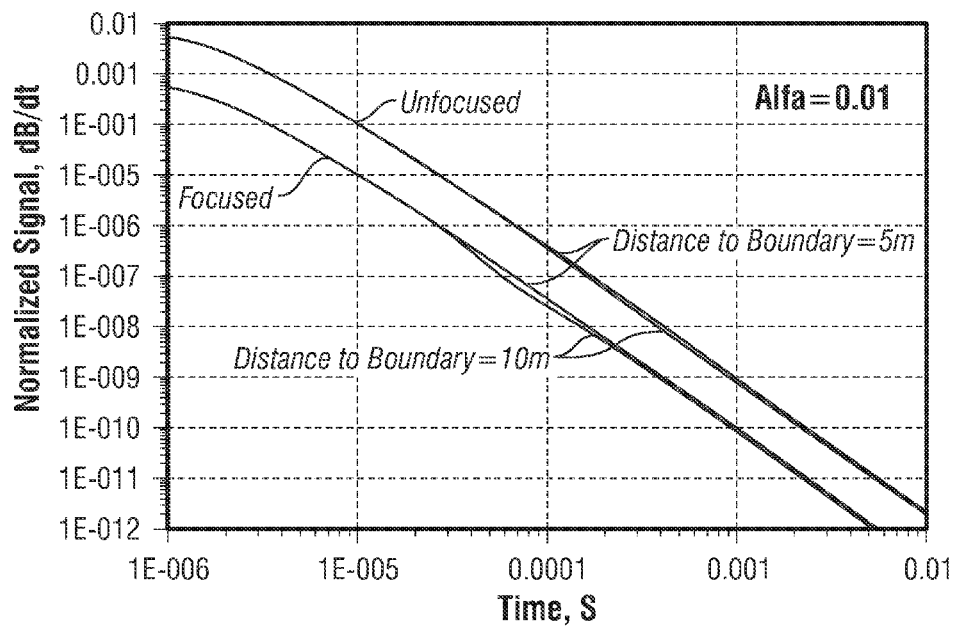
FIG. 7 graphically illustrates a comparison between a focused and an unfocused signal in one embodiment according to the present disclosure.
Figure 8:
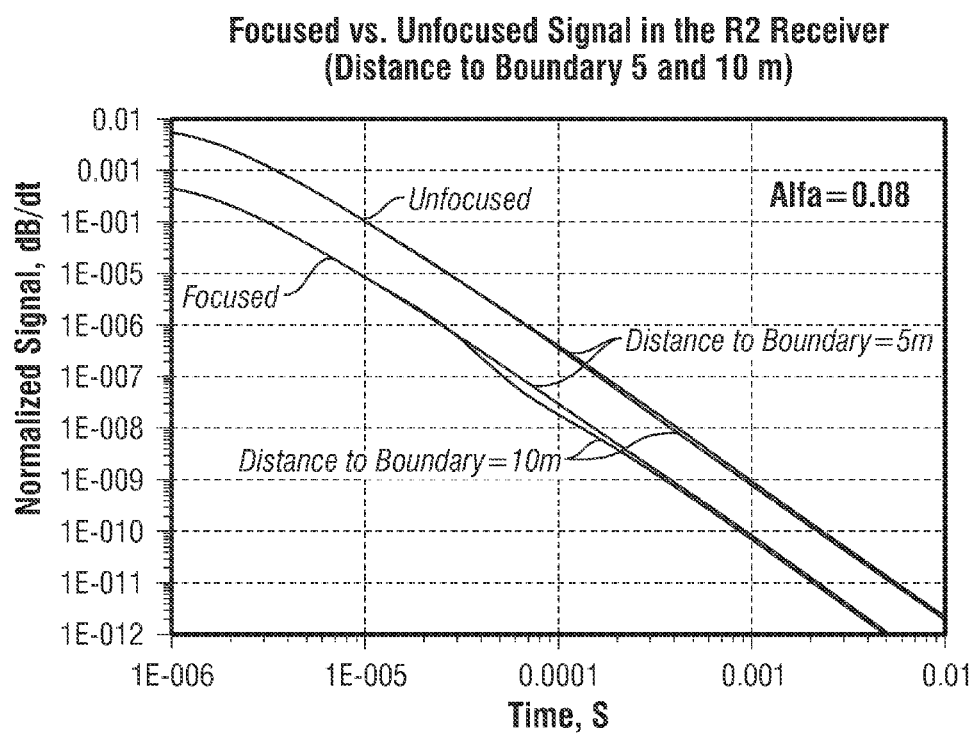
FIG. 8 graphically illustrates a comparison between a focused and an unfocused signal in one embodiment according to the present disclosure.
Figure 9:
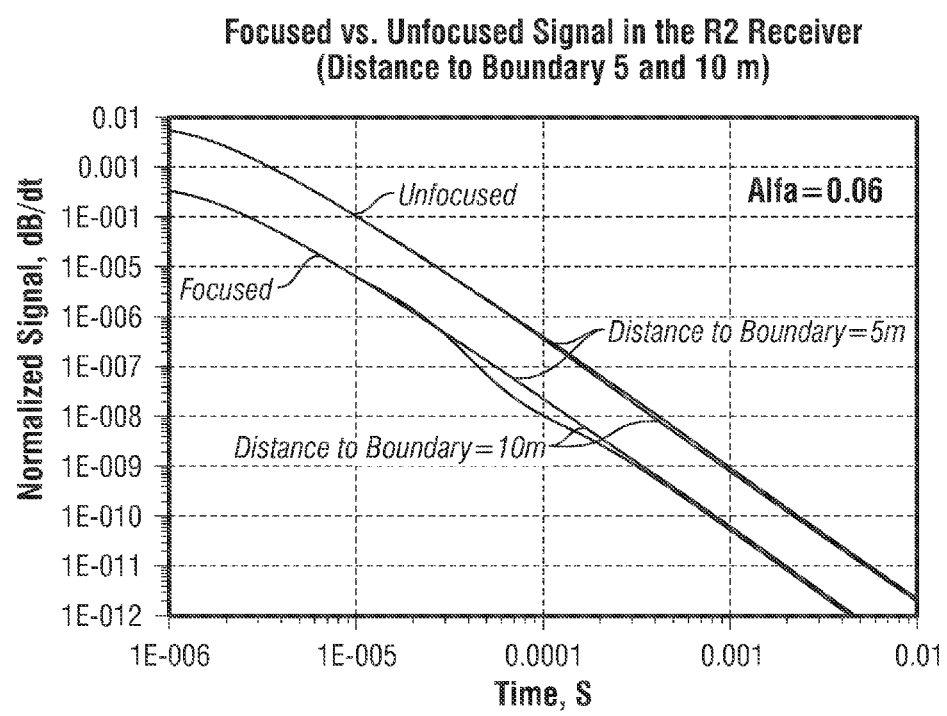
FIG. 9 graphically illustrates a comparison between a focused and an unfocused signal in one embodiment according to the present disclosure.
Figure 10:
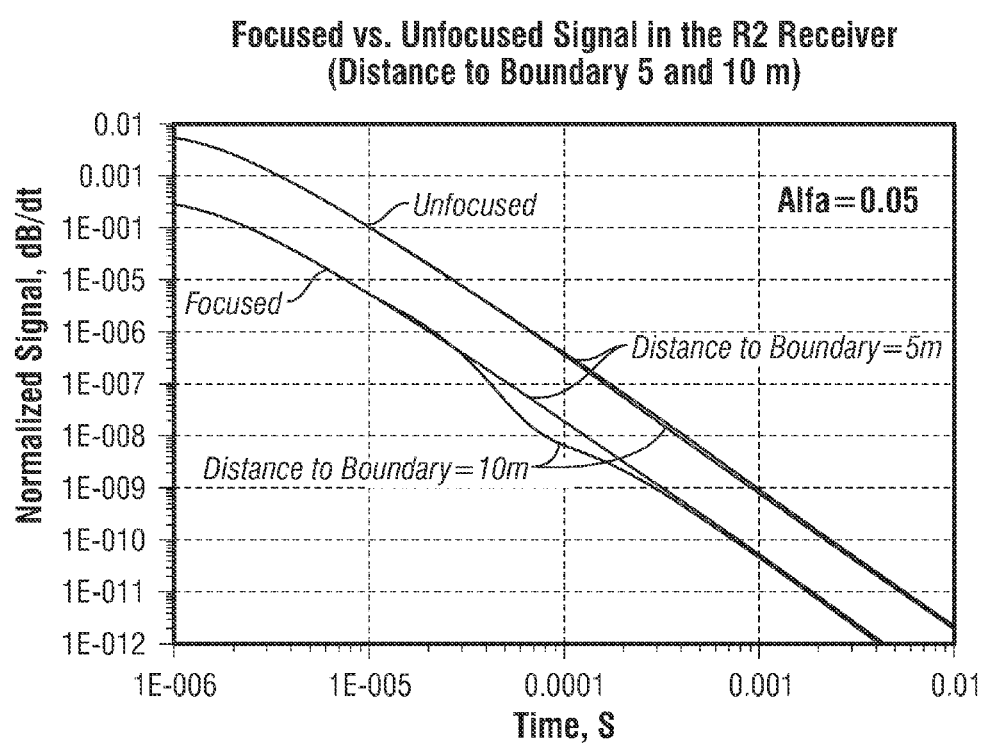
FIG. 10 graphically illustrates a comparison between a focused and an unfocused signal in one embodiment according to the present disclosure.

Next, the Time Domain Focusing (TDF) transformation is developed by calculating F-factor according to formula (2). FIG. 5, shows a focusing factor when the distance from the tool to the borehole boundary is 5 meters 510 and a focusing factor 520 when the distance from the tool to the borehole boundary is 10 meters. The focusing factors 510, 520 are overlapped in most of the detection time interval and the best sensitivity to the parameter of interest d falls into the time window between 0.5 and 5 μs. This may be confirmed by sensitivity curves calculated for the different defocusing factors of the TDF transformations (FIG. 6). As shown in FIG. 6, the focused curves demonstrate superior sensitivity to the boundary position compared to the sensitivity of the unfocused signal. The maximum sensitivity corresponds to the case when minimal defocusing factor is applied (α=0.05). The increased sensitivity of the TDF transformations is reached at the expense of the signal cancellation. The degree of the signal cancellation is seen from comparison of unfocused and focused curves presented in FIG. 7-FIG. 10 and corresponding to the different values of the defocusing factor. In case of a large defocusing factor ($\alpha$=0.10), the cancellation is about 90% and it goes up to 98% in case of small defocusing factor ($\alpha$=0.05).

The technique of constructing TDF transformations can be further modified when reduction of the signal from the region uphole of transmitter $T_2$ is desired. This could be done by either increasing number of transmitters or number of receivers. This may be illustrated as follows: in the case where one additional receiver $R_3$ is placed below transmitter $T_2$, additional focusing may be provided, if it is required that the following two conditions hold:

$$\begin{cases} S_1^1(t) + F_1(t)S_1^2(t) + F_2(t)S_1^3(t) = 0 \\ S_2^1(t) + F_1(t)S_2^2(t) + F_2(t)S_2^3(t) = 0 \end{cases} \quad (8)$$

At each moment of time $t_k$ the linear system (8) can be solved with respect to focusing functions $F_1(t_k)$, $F_2(t_k)$ and thus these functions can be defined for the whole time interval. After focusing functions are found the TDF transformation in the receiver $T_3$ can be written as:

$$\Delta S_3(t) = S_3^{-1}(t) + F_1(t)S_3^{-2}(t) + F_2(t)S_3^{-3}(t) \quad (9)$$

The focusing transformation (9) describing $\Delta S_3(t)$ has features similar to $\Delta S_2(t)$. The main difference is increased cancellation of the region above transmitter $T_2$ from forming the TDF transformation in the receiver $R_3$.

One embodiment according to the present disclosure includes method 1100. In step 1110 of method 1100, the downhole tool 40 may be positioned with borehole 2. In step 1120, the transmission coils 8, 16, 24 may be activated sequentially to transmit EM energy 9 into formation 4. In step 1130, receiver coils 13, 26 may generate receiver information based on EM signals 12 due to eddy currents 11 generated in the formation 4 due to the EM energy 9. In step 1140, receiver information may be used to estimate a focusing factor. In step 1160, the focusing factor may be applied to the receiver information, thus reducing an undesirable signal component. This reduction is not limited to the receiver information component from the receiver furthest from the drill bit 7, but this technique may be used to reduce the receiver information component coming from any receiver coil. One of skill in the art may see that the focusing factor estimated in step 1140 may be used to reduce signal information coming from in front of the drill bit, behind the drill bit, or anywhere in between as long as there are multiple receivers. In step 1170, a parameter of interest may be estimated using the receiver information after application of the focusing factor. Some embodiments may include step 1150, where a defocusing factor may be estimated. When a defocusing factor is estimated, the defocusing factor may be applied in step 1160 along with the focusing factor.

In the embodiment of FIG. 1, the downhole tool 40 is configured to perform induction measurements. Measurements of the resistivity (or its inverse conductivity) of the formation 4 may be performed using a variety of electromagnetic techniques such as alternating current (AC) techniques, direct current (DC) techniques, induction techniques, galvanic techniques, and transient electromagnetic techniques. The galvanic techniques generally use at least two electrodes for conducting a current through the formation 4. Voltage and current measurements may then be used to estimate the resistivity.

The term "signals" used herein relates to any type of signals used to measure a property of the formation 4. Non-limiting examples of the signals include electromagnetic signals, current signals, voltage signals, neutron signals, gamma ray signals, seismic signals and acoustic signals. The techniques disclosed herein for estimating a property of the earth formation 4 ahead of the borehole 2, or other downhole location, are applicable to any type of signal used to measure a property of the formation 4.

Figure 11:
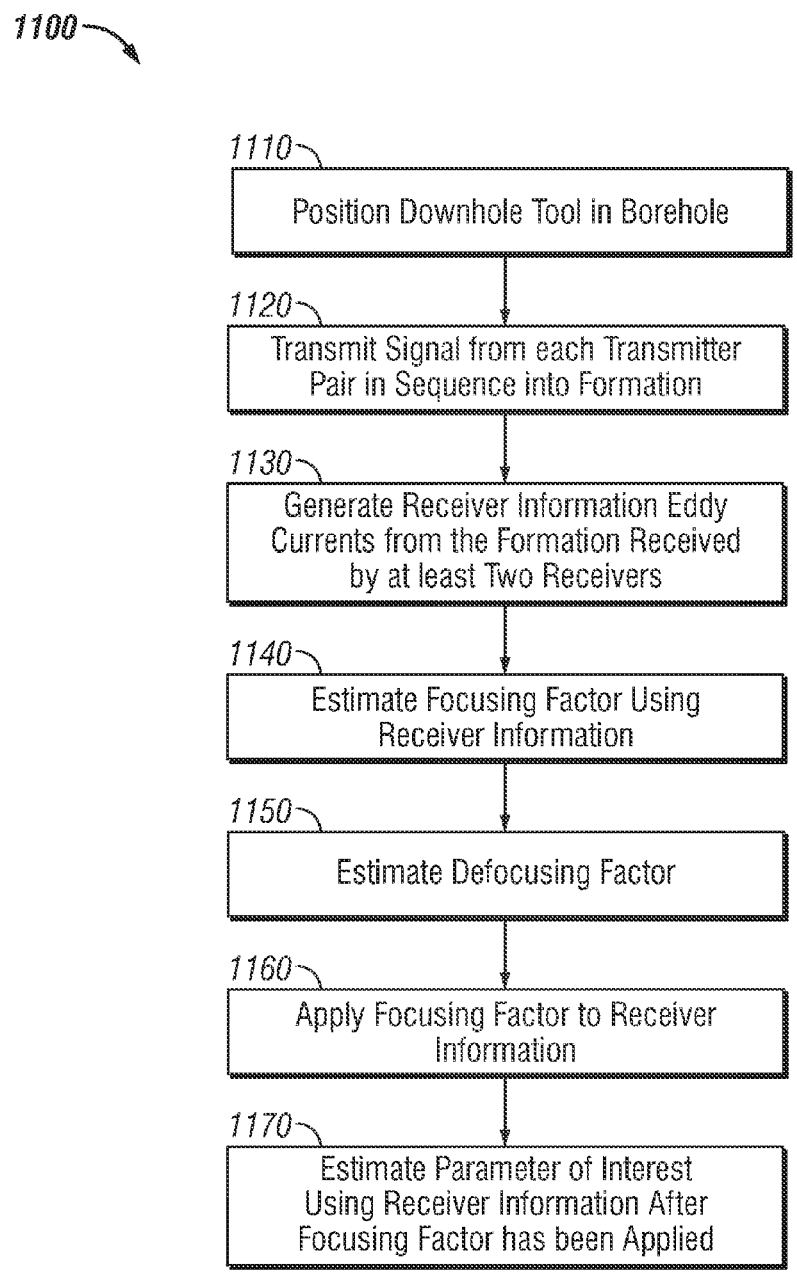
FIG. 11 shows a flow chart of an exemplary method according to one embodiment of the present disclosure.
Figure 12:
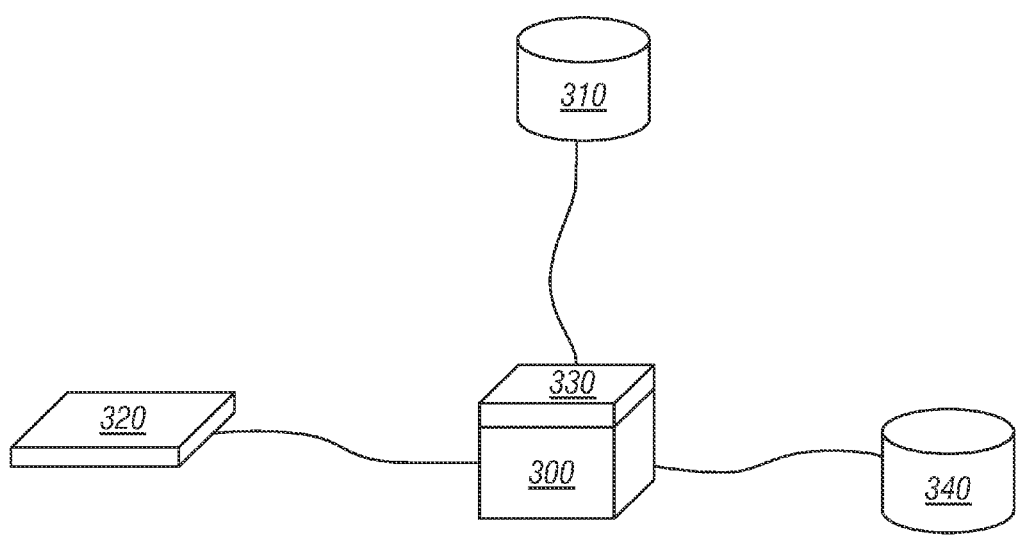
FIG. 12 illustrates an information processing device that may be used to implement certain embodiments of the disclosure.

The techniques disclosed herein are applicable to wire line logging, logging-while-drilling (LWD), and measurements-while-drilling (MWD). Accordingly, the logging tool 10 may be conveyed in the borehole 2 by non-rigid carriers such as a wireline or a slick line or rigid carriers such as coiled tubing or jointed drill pipe. Other carriers, such as downhole tractor or other suitable mechanisms, may also be used As shown in FIG. 11, certain embodiments of the present disclosure may be implemented with a hardware environment using a processing unit 14 that includes an information processor 300, a data storage medium 310, an input device 320, processor memory 330, and may include peripheral data storage medium 340. The input device 320 may be any data reader or user input device, such as data card reader, keyboard, USB port, etc. The data storage medium 310 stores formation characteristic data provided by a user or user system. Data storage medium 310 may be any standard computer data storage device, such as a USB drive, memory stick, hard disk, removable RAM, or other commonly used memory storage system known to one of ordinary skill in the art including Internet based storage. Data storage medium 310 stores a program that when executed causes information processor 300 to execute the disclosed method. Data storage medium 310 may also store the formation data provided by the user, or the formation data may be stored in a peripheral data storage medium 340, which may be any standard computer data storage device, such as a USB drive, memory stick, hard disk, removable RAM, or other commonly used memory storage system known to one of ordinary skill in the art including Internet based storage. Information processor 300 may be any form of computer or mathematical processing hardware, including Internet based hardware. When the program is loaded from data storage medium 310 into processor memory 330 (e.g. computer RAM), the program, when executed, causes information processor 300 to retrieve formation data from either data storage medium 310 or peripheral data storage medium 340 and process the formation data to characterize the formation.

In support of the teachings herein, various analysis components may be used, including a digital and/or an analog system. For example, the processing unit 14 can include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, power supply (e.g., at least one of a generator, a remote supply and a battery), vacuum supply, pressure supply, cooling component, heating component, motive force (such as a translational force, propulsional force or a rotational force), magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

One illustrative use involves drilling. During drilling operations, it may be useful for a drilling operator or petroanalyst to be able to estimate or determine a type of material that is about to be drilled. That is, the drilling operator or petroanalyst would want to know significant features of the earth formation ahead of the drill bit about to be penetrated. In such uses, the selected downhole location may be proximate to the drill bit and the forward formation may be the formation lying ahead of the drill bit. Another illustrative use may involve conveying a logging tool, with either a rigid or a non-rigid carrier, to log or re-log a well. In such uses, the downhole location may be a location on the carrier and the forward formation may be the formation ahead of the downhole location, but not necessarily beyond the borehole.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the disclosure.

While the disclosure has been described with reference to exemplary embodiments, it will be understood that various changes may be made and equivalents may be substituted for elements thereof without departing from the scope of the disclosure. In addition, many modifications will be appreciated to adapt a particular instrument, situation or material to the teachings of the disclosure without departing from the essential scope thereof. Therefore, it is intended that the disclosure not be limited to the particular embodiment. While the foregoing disclosure is directed to the embodiments of the disclosure, various modifications will be apparent to those skilled in the art.

I claim:

1. A method for estimating a parameter of interest relating to a subsurface formation, comprising:
generating a plurality of signals using at least two transmitters, wherein the plurality of signals are sequential such that the plurality of signals proceed from a transmitter of the at least two transmitters furthest from a selected location to a transmitter of the at least two transmitters closest to the selected location;
estimating the parameter of interest by applying at least one focusing function to at least one receiver output from a receiver of a plurality of receivers, the at least one focusing function being estimated using transient electromagnetic signals received downhole by a first receiver of the plurality of receivers responsive to the plurality of signals, wherein the transient electromagnetic signals comprise a first signal and a second signal, and the at least one focusing function comprises a ratio of the first signal and the second signal; and
using the parameter of interest to conduct further operations in the subsurface formation; and wherein the at least one focusing function is estimated to reduce a sum of the transient electromagnetic signals received by the first receiver to approximately zero.

2. The method of claim 1, further comprising:
receiving the transient electromagnetic signals with the plurality of receivers,
wherein the plurality of receivers are mounted along a carrier for use in a wellbore.

3. The method of claim 1, further comprising:
conveying the plurality of receivers in a wellbore using a carrier.

4. The method of claim 1, wherein the at least one focusing function comprises:

$$F(t) = -S_1^1(t)/S_1^2(t),$$

Wherein
$S_1^1(t)$ is a first signal of the plurality of signals received by the first receiver, and
$S_1^2(t)$ is a second signal of the plurality of signals received by the first receiver.

5. The method of claim 4, wherein the at least one focusing function further comprises:
a defocusing factor $\alpha$, such that $\Delta S_2 = S_2^1(t) + (F(t)+\alpha)S_2^2(t)$.

6. The method of claim 1, wherein the parameter of interest is estimated by a mathematical function comprising:

$$\Delta S_2 = S_2^1(t) + F(t)S_2^2(t),$$

wherein,
$S_2^1(t)$ is a first output of the at least one receiver output from the receiver of the plurality of receivers closest to the selected location,
$\Delta S_2$ is a focused output of the at least one receiver output from the receiver of the plurality of receivers,
$F(t)$ is the at least one focusing function, and
$S_2^2(t)$ is a second output of the at least one receiver output from the receiver closest to the selected location.

7. The method of claim 1, wherein the plurality of receivers are disposed along a carrier in a borehole and the parameter of interest is located ahead of the carrier.

8. The method of claim 1, wherein the at least one focusing function operates in a time domain.

9. An apparatus for estimating a parameter of interest relating to a subsurface formation, comprising:
a carrier configured for use in a wellbore;
a plurality of receivers mounted along the carrier, comprising:
a first receiver;
at least one additional receiver located between the first receiver and a selected location, wherein each receiver of the plurality of receivers is configured to detect energy; and
a first transmitter located on the carrier uphole of the selected location:
at least one transmitter located on the carrier between the first transmitter and the selected location, wherein the at least one transmitter and the first transmitter are configured to generate a plurality of signals, wherein the plurality of signals are sequential such that the plurality of signals proceed from the first transmitter furthest from the selected location to the at least one transmitter closest to the selected location;

a processor configured to process the plurality of signals received by the plurality of receivers to estimate the parameter of interest by applying at least one focusing function to at least one receiver output from a receiver of the plurality of receivers, the at least one focusing function being estimated using transient electromagnetic signals downhole by the first receiver of the plurality of receivers responsive to the plurality of signals, wherein the transient electromagnetic signals comprise a first signal and a second signal, and the at least one focusing function comprises a ratio of the first signal and the second signal; and wherein using the parameter of interest to conduct further operations in the subsurface formation; and wherein the at least one focusing function is estimated to reduce a sum of the transient electromagnetic signals received by the first receiver to approximately zero.

10. The apparatus of claim 9, wherein the parameter of interest is estimated by the at least one focusing function comprises:

$$\Delta S_2 = S_2^1(t) + F(t) S_2^2(t),$$

wherein, $S_2^1(t)$ is a first output of the at least one receiver output from the receiver closest to the selected location, $\Delta S_2$ is a focused output of the at least one receiver from the receiver closest to the selected location, F(t) is the at least one focusing function, and $S_2^2(t)$ is a second output of the at least one receiver output from the receiver closest to the selected location.

11. The apparatus of claim 10, wherein the estimation of the parameter of interest uses a defocusing factor α, such that $\Delta S_2 = S_2^1(t) + (F(t) + \alpha) S_2^2(t)$.

12. The apparatus of claim 9, the at least one focusing function comprises:

$$F(t) = -S_1^1(t)/S_1^2(t),$$

wherein $S_1^1(t)$ is a first signal of the plurality of signals received by the first receiver, and $S_1^2(t)(t)$ is a second signal of the plurality of signals received by the first receiver.

13. A method for estimating a parameter of interest relating to a subsurface formation, comprising:

generating a plurality of signals using at least two transmitters, wherein the plurality of signals are sequential such that the plurality of signals proceed from a transmitter of the at least two transmitters furthest from a selected location to a transmitter of the at least two transmitters closest to the selected location; and estimating the parameter of interest by applying at least one focusing function to at least one receiver output from a receiver of a plurality of receivers, the at least one focusing function being estimated using transient electromagnetic signals received downhole by a first receiver of the plurality of receivers responsive to the plurality of signals, using the parameter of interest to conduct further operations in the subsurface formation; and wherein the parameter of interest is estimated by a mathematical function comprising:

$$\Delta S_2 = S_2^1(t) + F(t) S_2^2(t),$$

wherein, $S_2^1(t)$ is a first output of the at least one receiver output from the receiver of the plurality of receivers closest to the selected location, $\Delta S_2$ is a focused output of the at least one receiver output from the receiver of the plurality of receivers closest to the selected location, F(t) is the at least one focusing function, and $S_2^2(t)$ is a second output of the at least one receiver output from the receiver of the plurality of receivers closest to the selected location.

* * * * *